Patented Sept. 2, 1947

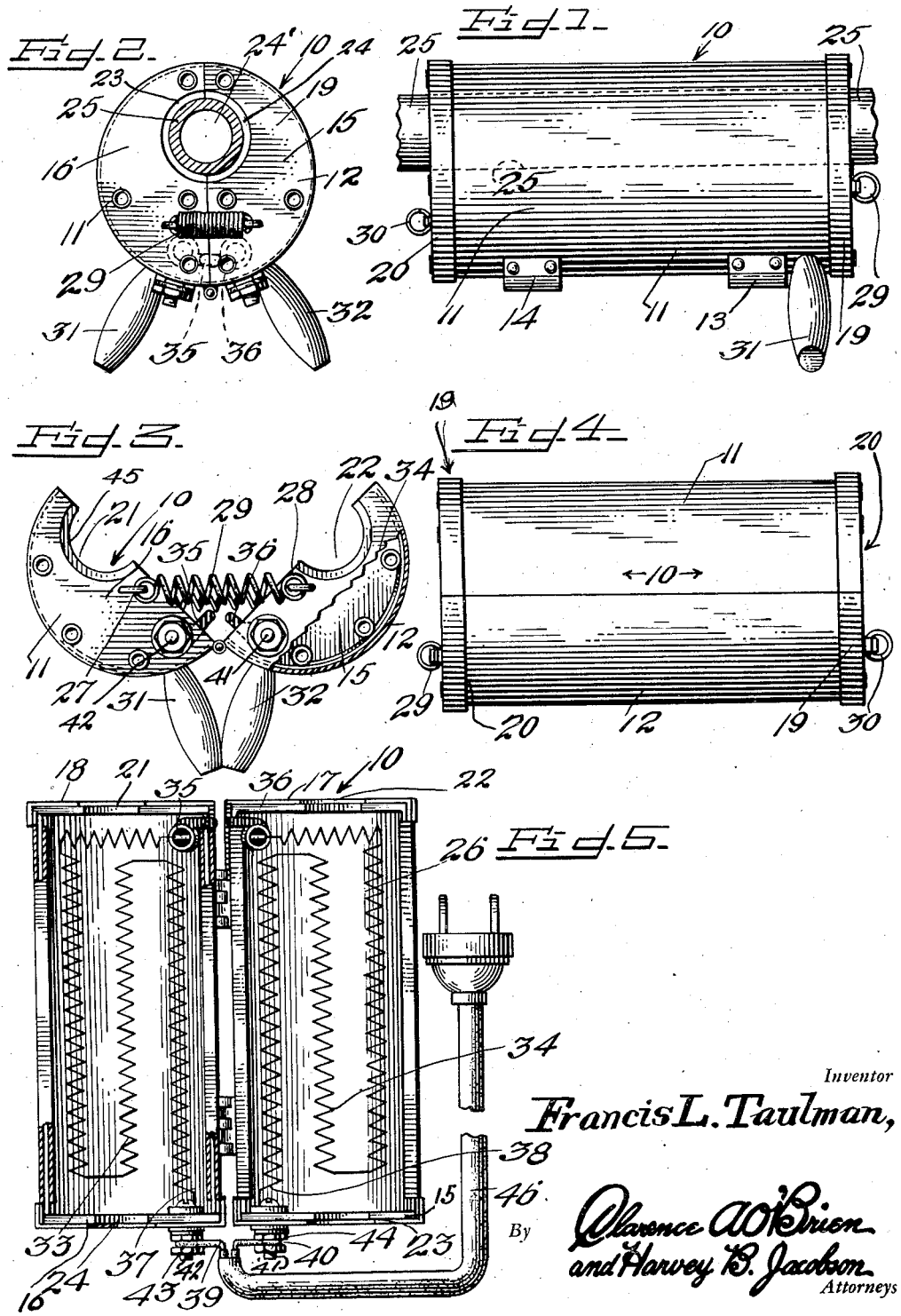

2,426,976

UNITED STATES PATENT OFFICE 2,426,976

PIPE THAWING DEVICE

Francis L. Taulman, Tulsa, Okla.

Application July 27, 1945, Serial No. 607,397

1 Claim. (Cl. 219—19)

This invention relates to a plumbing appliance and has for its object to provide a very simple, inexpensive and rapid device for thawing out frozen pipes.

Another object of the invention is to provide a pipe thawing device of such simple operation that it may be used just as effectively by any novice as by an efficient plumber.

A further object of the invention is to provide a snap or pipe heater.

A further object of my invention is to provide a household electric heater for thawing pipes.

Other features and advantages will become more readily apparent from the following description and the accompanying illustrative drawings in which:

Figure 1 is a side elevational view of my invention,

Figure 2 is an end elevation thereof,

Figure 3 is a view similar to Figure 2, shown in open position,

Figure 4 is a top plan view of the device shown closed, and

Figure 5 is a similar view shown opened up.

In the accompanying drawings and in the following specification the same reference characters refer to the same parts and 10, indicates my thawing device which consists of a pair of semi-cylindrical, longitudinal drum members 11 and 12, connected together by hinges 13 and 14, and each section 15, 16 and 17 and 18, respectively of the heads 19 and 20, of which are provided with half-cylindrical apertures 21, 22 and 23 and 24, which when closed upon one another form aligning bores 24', adapted to seat snugly around a pipe 25, and enclose a section thereof with the chamber 26, within the device.

The two sections 15 and 16, of the end wall 19, are connected by the ends 27 and 28, of a contraction spring 29, whereby the two sections 11 and 12, form self-closing jaws adapted to maintain themselves frictionally upon a vertically disposed pipe. A similar spring 30, may be connected to the head end 20. Lever handles 31 and 32, are attached to each member 11 and 12, at one end of the device and on the opposite sides of the hinge 13, whereby the said jaw sections may be readily opened against the tension of said springs 29 and 30, in order to encompass a pipe.

Fitted into each of said members 11 and 12, are a pair of electric heating elements 33 and 34, which are fully insulated from the walls of said members, said elements 33 and 34, being automatically cut on and off by the contact members 35 and 36, as the jaws are closed or opened. The terminals 37 and 38, of said heating elements are connected to plug terminals 39 and 40, through bolts 41 and 42, projecting through the walls 15 and 16, and to the outer ends of which bolts members 39 and 40, are secured by nuts 43 and 44. Very flexible insulation 45, is fixed around the edges of bores 24', in order that the device may adjust itself to pipes of varying diameter and also to prevent escape of heat from the said chamber. A lead cord 46, may be connected to members 43 and 44, and plugged into any house socket.

In many severe climates and especially in suburban and country homes where proper pipe protection is unavailable, and in usually mild climates where such protection is thought unnecessary but where there are occasionally severe freezes; one of the above described "little plumbers" would prove of inestimable value, save many plumbing bills and often the repiping of a house. It is not only inexpensive, effective and of durable structure, but so simple to manipulate that it may be used by any child and with satisfaction, as the current cuts off as soon as the device is opened to remove from a pipe. Furthermore, its use will eliminate many fires caused by attempts to thaw frozen pipes with flame devices in inaccessible places.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

A device for thawing frozen pipes comprising a pair of elongated semi-cylindrical spaced double walled shells, end closures therefor having alined arcuate pipe engaging seats formed therein, connectors secured to the end closures at one end of said device, one contact of a pair of coacting contacts carried by each shell of said device, heating elements connected between the connectors and contact in each shell, an electric conductor attached to said connectors for energizing said heating elements when attached to a suitable source of electric current supply, hinges connected between the opposite ends of said shells, handles secured to the shells adjacent one end of said device, and resilient tensioning means disposed at the opposite ends of said device between the closure ends of adjacent shells for normally and resiliently holding said shells in closed position, and said contacts being so arranged that the circuit to said heating elements will be made upon closing of the shells around a pipe and broken upon the separation of said shells.

FRANCIS L. TAULMAN.

REFERENCES CITED

The following references are of record in the file of this patent:

UNITED STATES PATENTS

| Number | Name | Date |
|---|---|---|
| 957,728 | Bliss | May 10, 1910 |
| 1,316,190 | Sackerman | Sept. 16, 1919 |
| 1,786,120 | Lynam | Dec. 23, 1930 |